US008704668B1

(12) United States Patent
Darrell et al.

(10) Patent No.: US 8,704,668 B1
(45) Date of Patent: Apr. 22, 2014

(54) SYSTEM FOR MONITORING AND ALERTING BASED ON ANIMAL BEHAVIOR IN DESIGNATED ENVIRONMENTS

(76) Inventors: Trevor Darrell, Dover, MA (US); Anna Hagstrom, Dover, MA (US)

( * ) Notice: Subject to any disclaimer, the term of this patent is extended or adjusted under 35 U.S.C. 154(b) by 799 days.

(21) Appl. No.: 11/379,268

(22) Filed: Apr. 19, 2006

Related U.S. Application Data

(60) Provisional application No. 60/673,237, filed on Apr. 20, 2005.

(51) Int. Cl.
*G08B 23/00* (2006.01)

(52) U.S. Cl.
USPC ............... 340/573.3; 340/573.1; 340/540; 340/500

(58) Field of Classification Search
None
See application file for complete search history.

(56) References Cited

U.S. PATENT DOCUMENTS

| | | | | |
|---|---|---|---|---|
| 4,968,974 | A * | 11/1990 | Sakano | 340/573.3 |
| 6,418,876 | B1 * | 7/2002 | Hall et al. | 119/14.08 |
| 6,535,131 | B1 * | 3/2003 | Bar-Shalom et al. | 340/573.1 |
| 6,678,413 | B1 * | 1/2004 | Liang et al. | 382/181 |
| 6,715,444 | B1 * | 4/2004 | Yabusaki et al. | 119/421 |
| 7,059,275 | B2 * | 6/2006 | Laitinen et al. | 119/720 |
| 7,068,842 | B2 * | 6/2006 | Liang et al. | 382/181 |
| 7,269,516 | B2 * | 9/2007 | Brunner et al. | 702/19 |
| 7,395,966 | B2 * | 7/2008 | Braiman | 235/454 |
| 2002/0032871 | A1 * | 3/2002 | Malan et al. | 713/201 |
| 2004/0141636 | A1 | 7/2004 | Liang et al. | |
| 2004/0222987 | A1 * | 11/2004 | Chang et al. | 345/419 |
| 2005/0066910 | A1 | 3/2005 | Tecott et al. | |
| 2006/0187305 | A1 * | 8/2006 | Trivedi et al. | 348/169 |

FOREIGN PATENT DOCUMENTS

DE 10210949 A1 * 10/2003 ............. G08C 25/00

OTHER PUBLICATIONS

Arun Hampapur, Autonomic User Interface, 2002, IBM Research Report, RC22542 (W0208-038), pp. 1-28.*
Tony Jebara, Statistical Imitative Learning from Perceptual Data, 2002, IEEE, Proceedings of the 2nd International Conference on Development and Learning, pp. 1-5.*
Nicu Sebe, Multimodal Emotion Recognition, 2004, University of Amsterdam, pp. 1-20.*
Jane Brooks Zurn, A Real-Time Rodent Tracking System for Both Light and Dark Cycle Behavior Analysis, Aug. 2005, pp. 1-6, MED Associates, Inc. Georgia, Vermont, USA.
Medical News Today, Animal Behavior—New Automated Monitoring Technique, Feb. 11, 2004, pp. 1-2, San Diego, California, http://www.medicalnewstoday.com/releases/5830/php.
Tucker Balch, Robots, Vision, and Animal Behavior, pp. 1-11.
Press Release. Cal-(IT) Scientists Unveil Pilot Project at UC San Diego for Automated Monitoring of Animal Behavior in Medical Research, Feb. 10, 2004, pp. 1-3, San Diego, California.
Serge Belongie, Kristin Branson, Keith Jenne, Vincent Rabaud, Phil Richter, Geert Schmid-Schoenhein, John Wesson, The Smart Vivarium, pp. 1-28.

(Continued)

*Primary Examiner* — Mohammad Ghayour
*Assistant Examiner* — Brian Wilson
(74) *Attorney, Agent, or Firm* — Daly, Crowley, Mofford & Durkee, LLP

(57) ABSTRACT

A system for monitoring and alerting based on animal behavior includes an apparatus to observe one or more animals using a sensor network, a processor to capture tracking information and to interpret animal state based on sensor observations, and a communication device to communicate alerts based on animal state.

12 Claims, 3 Drawing Sheets

(56) References Cited

OTHER PUBLICATIONS

Kristin Branson, Vincent Rabaud, Serge Belongie, Three Brown Mice, See How They Run, pp. 1-8, U.C. San Diego, La Jolla, California.

Serge Belongie, Jitendra Malik, Jan Puzicha, Shape Matching and Object Recognition Using Shape Contexts, Apr. 2002, pp. 509-522, vol. 24, Issue 24.

Gina Kline, Saddlebrook Barncams, Bringing you Piece of Mind, pp. 1-4.

D-Link, Securicam Network, DCS-5300G 802.11g Internet Camera with Pan, Tilt, & Digital Zoom, Oct. 6, 2004, pp. 1-145.

Dr. Derek Robert Magee, Machine Vision Techniques for the Evaluation of Animal Behaviour, Oct. 2000, pp. 1-200, University of Leed, School of Computing.

* cited by examiner

SYSTEM FOR MONITORING AND ALERTING BASED ON ANIMAL BEHAVIOR IN DESIGNATED ENVIRONMENTS

CROSS-REFERENCE TO RELATED APPLICATIONS

This application claims priority to provisional application Ser. No. 60/673,237, titled "A SYSTEM FOR MONITORING AND ALERTING BASED ON ANIMAL BEHAVIOR IN DESIGNATED ENVIRONMENTS", filed Apr. 20, 2005, which is incorporated herein in its entirety.

FIELD OF THE INVENTION

This invention relates generally to monitoring systems and more particularly to a system for monitoring and alerting based on animal behavior.

BACKGROUND OF THE INVENTION

Many animals of high value are kept in a variety of only partially attended, enclosed spaces. Since these animals often represent valuable financial and even emotional investments, and/or may be rare or endangered animals, ensuring the animals are safe is desirable. It may also be desirable to know other information regarding an animal such as whether it experienced medical trauma, is going into labor, has escaped, has been attacked by another animal, or other unforeseen circumstances such as the weather around the animal's environment. Other useful information also includes allowing the owner to more accurately understand specific animal behavior, such as if a specific cow is eating enough, if an animal is normally active, or if one animal is getting crowded out of a food source by other animals.

SUMMARY OF THE INVENTION

In accordance with the present invention, a system for monitoring and alerting based on animal behavior includes observing one or more animals using a sensor network, tracking and interpreting animal state based on sensor observations, and communicating alerts based on animal state. With such a technique, animal behavior can be monitored and when said behavior falls outside an acceptable animal state, an alert can be immediately communicated to a user so the user can react accordingly.

In accordance with a further aspect of the present invention, the user may specify the rules by providing example behaviors of interest. For example, where the animals are stabled horses, the tracked attributes of the animal state can include whether a horse is exhibiting birthing behaviors, and a user can indicate a desired alert when such behavior occurs. With such a technique, animal behaviors of interest can be monitored such as birthing and one can intervene as necessary to ensure the behavior of interest does not cause harm to the animal, or be present in the animal's environment for first hand observation.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
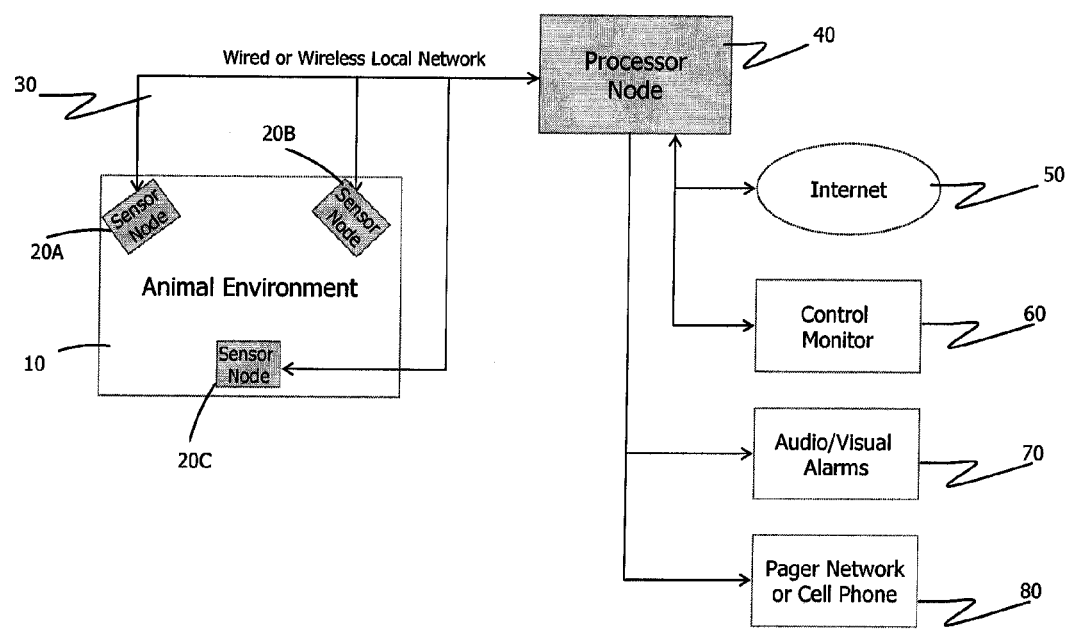
FIG. 1 is a block diagram of a system for monitoring animal behavior according to the invention.

We have invented a method for monitoring animals and alerting human owners or operators based on animal behavior in designated environments. These environments include stalls, cages, paddocks, pastures, tie-stalls, zoo exhibit spaces, and a designated area in and around a residential home or farm. The system monitors the given environment in real time and interprets the video and audio input data such that upon an unusual occurrence, such as a medical trauma or an animal going into labor, the system sends an alert to the respective owner or relevant persons. The person may then notify the system that the alert has been received, may review observations of the animal, examine the details of the detected event, may view real-time observations of the animal, and may determine the urgency required to attend to the animal.

Our system addresses current needs of animal owners. Many animals of high value (monetary or otherwise) are kept in a variety of only partially attended, enclosed spaces. Since these animals often represent valuable financial (and/or emotional) investments, and/or they may be rare or endangered animals, having an automatic method for monitoring and alerting will allow owners or operators to respond quickly to harmful or particularly interesting circumstances. Examples of these circumstances might include medical trauma, going into labor, escape, attacks from other animals, or other unforeseen circumstances such as weather. Other useful instances include allowing the owner to more accurately monitor in real time a specific animal behavior, such as if a specific cow is eating enough, if an animal is normally active, or if one animal is getting crowded out of a food source by other animals. These types of circumstances currently require constant surveillance in order to allow the owner to fully understand the specific animal's behavior or the cause of a problem they may be experiencing with the animal. It would be desirable for owners to be able to obtain this information without having to constantly be watching the animal. Having automated monitoring and alerts based on animal behavior would therefore be valuable, as human surveillance and monitoring are too laborious and expensive.

We have invented a system using audio and video sensors to satisfy these needs. It allows for real time human intervention in potential emergency situations, and for ongoing monitoring of animal activity and behavior for optimal maintenance and diagnosis. The system may send a notification immediately to the owner when a sensor network (typically audio and video sensors) detects significant unusual behavior for a specific animal in their specific environment. The system is passive and non-invasive, and does not require physical intervention—no foreign devices are placed on or in the animal bodies (in contrast to certain state-of-the-art methods for detecting when a large animal goes into labor).

The system provides intelligent and context-specific interpretation of sensor data and generation of alerts or alarms in order to address the animal owner's specific need for information. For example, a sheep farmer might be more concerned about the presence of an animal that does not belong in the paddock, signifying a possible attack on the sheep by a predator; whereas the zoo keeper might be more interested in an animal's absence from their cage, signifying their escape during the night.

Historically, human workers or other farm animals (or pets) have served to warn of unusual or problematic conditions in a barn or other enclosed environment. For example, a farmer's dog may bark and warn the farmer when a horse is acting up in its stall, or if there are predators (e.g., coyotes) close to a sheep paddock.

The advent of video camera and video recording technology has allowed the remote monitoring of sites, including barns and enclosed animal environments. Closed circuit television monitoring, and more recently "webcams" which have a camera and Internet communication ability, allow remote video viewing and recording.

In a similar fashion to existing consumer products for baby monitoring, which transmit audio from one location to another, or commercial systems for video surveillance, which allow a security officer to watch over parts of a store or office complex from a security center, existing barn CCTV or webcam products allow an animal owner to watch his or her animal from a remote location (see, for example, products currently available at SaddleBrook BarnCams, www.barn-cam.com.) These existing products are useful for providing a real-time link to watch over a remote site, but they generally require a person to continuously watch a screen to see if a significant event has occurred.

Commercial "webcam" products allow for the recording of images only when motion occurs, or based on an external electronic signal. However, since animals move continuously these mechanisms are inadequate to detect the types of significant behavior events described above. To monitor for important, unusual behavior events using existing CCTV/webcam systems, an operator has to continuously watch the video screen. To review previous animal activity, the operator has to screen the entire previously captured video. While the latter may be possible to do at a faster than real time speed (i.e., in "fast-forward" mode), it is still too time consuming to be practical.

Recently, university researchers have developed image analysis methods to perform automatic tracking of animal state. Derek Magee and colleagues at the University of Leeds, UK, have created a number of computer vision algorithms for analysis of the gait of different types of farm animals. (See Derek Magee, Ph.D. thesis, and related papers, for specific examples.) Serge Belongie and colleagues in the SmartVivarium project at the University of California, San Diego, have created systems which track animals in caged environments using a video camera. (For example see papers currently available on the SmartVivarium web site, and related literature.) These methods can classify and analyze the motion or posture of animals, for use in medical research to assess the impact of various interventions in laboratory mice (and similar animals).

The existing literature and prior art are limited in one or more of the following significant aspects: (i) they are restricted to use a single sensor or sensor type and are not able to integrate information from a network of heterogeneous sensors including audio and video sensors, which can be critical in monitoring large-scale environments; (ii) they do not perform interpretation of animal behavior, and require continuous monitoring of a video signal; (iii) they are not able to detect anomalous events in real time, and instead perform an ex-post-facto batch analysis to evaluate particular aspects of behavior; (iv) they do not have a means to communicate alerts to a human owner or operator, and provide that person the ability to remotely view the problem condition in real time; and (v) they do not have a means for specifying the priority of different detected events, and specifying what means for notification are to be performed in different operator and animal contexts or states.

Operator, or "user", context in a notification system includes such variables as the time of day, location of the user, current task or job being performed by the user, communications link availability between the alerting system and the user, and other quantities that would be relevant to determine the most appropriate means to communicate with the user. Animal context includes information in the system, either automatically generated or entered by a human operator, as to the recent history of the animal, the animal's medical state, and anticipated future events such as an upcoming birth or show performance.

Our invention has all of these desired attributes, and may be implemented using several component elements: (i) a network of audio and video (and possibly other) sensors; (ii) methods for calibration and registration, which align information from multiple sensors into a common reference frame; (iii) modules for tracking, interpretation and classification of animal activities; (iv) a database to store captured audio and video and inferred activities, which can play back sensor readings about events of interest; (v) an interface for operators to specify context and alert parameters; and (vi) means to generate an alert to the human operator using page, SMS, pre-recorded voice message, email, etc., for detected events which have passed a filtering step, where the modality of the alert is chosen based on context parameters.

We will describe these components in turn.

A Network of Audio and Video (and Possibly Other) Sensors.

Our invention uses a network of sensors comprised of more than one sensor of varying types including audio and video sensors. Sensors are grouped together in sensor nodes, which have a compression, initial processing, and communications component. In the preferred embodiment, images are digitized at the sensor node and sent over a digital local network to the processing node, typically using a wireless (or wired) Ethernet network. For example, the DLink DCS-5300G product contains a video camera connected to a web server, and wireless and wired Ethernet interfaces. In an alternate embodiment, a conventional video signal is sent over a video cable, or wireless analog video transmission device, to the processing unit, where the video is digitized. A functional network in our system would include a single sensor node with an audio sensor and a video sensor, connected to a processing node and a control monitor node. Additional sensor nodes would provide coverage for larger enclosed areas.

Methods for Calibration and Registration, which Align Information from Multiple Sensors into a Common Reference Frame.

Information from multiple sensors are aligned into a common spatio-temporal reference frame for later processing to allow interpretation of behavior from synchronized audio and video observations, and to allow interpretation of behavior from multiple viewpoints when sensors are located in different positions or have different views. Data from multiple sensor nodes are stored in a database according to timestamps from the sensor nodes. If the sensor is an active sensor, for example a pan-tilt-zoom camera platform, the position of the sensor is recorded in the database. Calibration from different views or viewpoints consists of finding the geometric relation between the various viewpoints. If the active sensor has been placed in an automatic scan mode, and is capturing a range of images at different view angles in the scene, image mosaicing algorithms can be used to stitch together a panoramic view of the scene based on the known position of the camera motors and on image alignment techniques known in the computer vision literature.

When more than one camera views the same space, and views one or more moving objects, such as animals moving about on a ground plane, techniques known in the computer vision literature can be employed to recover the position of the several cameras. Information about the position of animals in each camera is then recorded both relative to the local coordinate frame of each camera, and relative to the global coordinate frame established during calibration. In the preferred embodiment, calibration takes place in an on-line fashion without user intervention, but in a simpler system it may also be performed with a user-aided calibration process when the system is first installed and is periodically maintained.

Modules for Tracking, Interpretation and Classification of Animal Activities.

Image analysis methods are used to detect the position, orientation, and pose of animals seen in each video sensor, and this information is sent to the processor database. Image motion and background difference cues, and/or shape and appearance features, are employed to find regions in the image corresponding to individual animals. These measures are tracked over time, and are compared to known models of animal shape, appearance, and/or motion. Methods using the matching of moments of inertia of an extracted shape, or using distributions of matched patches (e.g., the "shape context" methods of Belongie and colleagues, and other related works in the computer vision literature), are well known to be able to accurately infer animal type, position, pose, and orientation from video sensor observations. Both a priori models of generic animal appearance and behavior, and models learned over time for the specific animals being tracked, may be used for the tracking and matching process.

Acoustic analysis similarly compares current audio sensor measurements to a typical background model, and to models of known sounds from a priori, generic models, as well as models learned over time for the specific animals being tracked.

Multimodal activity interpretation compares the recent history of animal position and pose, and acoustic patterns, and/or other sensor patterns, and detects unusual or interesting spatio-temporal patterns. Known techniques and methods in the computer vision and audio signal processing literature can be used to detect activities which are statistically rare, which are known to be interesting for a particular animal type (e.g. a particular motion pattern associated with colic in horses, or animals about to give birth), or those which are previously marked as interesting (through the control monitor interface) by the operator.

A Database to Store Captured Audio and Video and Inferred Activities, which can Play Back Sensor Readings about Events of Interest.

A digital storage device is used to store sensor observations corresponding to detected activities which generated alarms, and summarizations of observations for a specified history period. Through an activity review interface viewable on the control monitor (or through an Internet terminal), an operator can view current animal observations, inferred activities, observations corresponding to events which generated alarms, summaries of recent animal activity, and statistics of activities (or position or pose information) over time.

An Interface for Operators to Specify Context and Alert Parameters.

Operators can use an interface to specify filter properties, including what events shall generate alerts and alarms based on the current user and animal context. Operators may enter sensitivity levels, e.g., if a farmer wants to know every animal or moving creature that enters a specific space, the system will send an alert for every detected moving object. Another user might only want emergencies noted, thus only extreme movement or sounds will send an alert to them. The desired modality of notification can depend on the time of day, or other user context, as well as on the current context or state of tracked animals, and the type or class, position, or other aspects of newly detected animals.

Means to Generate an Alert to the Human Operator Via Page, SMS, Pre-Recorded Voice Message, Email, Etc., for Detected Events which have Passed a Filtering Step, where the Modality of the Alert is Chosen Based on Context Parameters.

Once an interesting event has been detected and filtered by the context specification module, the alert will then be transmitted via a variety of communications media, depending on the operator's context and alert parameters. Examples of possible alert receiving devices include cell phone (in the form of an SMS text message or pre-recorded voicemail), pager (in the form of a pre-set number or text message), email, etc. The owner can then access the activity and sensor review functionality via the monitor or by accessing the processor over the Internet to obtain a remote view of the animal's environment and to determine the requisite needed action.

Figure 2:
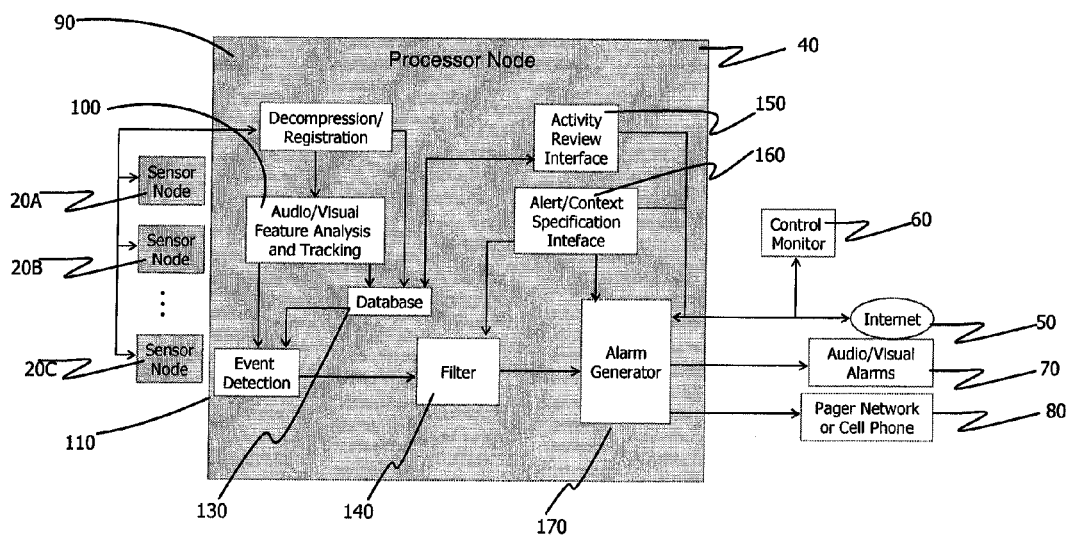
FIG. 2 is a block diagram of a processor node according to the invention.
Figure 3:
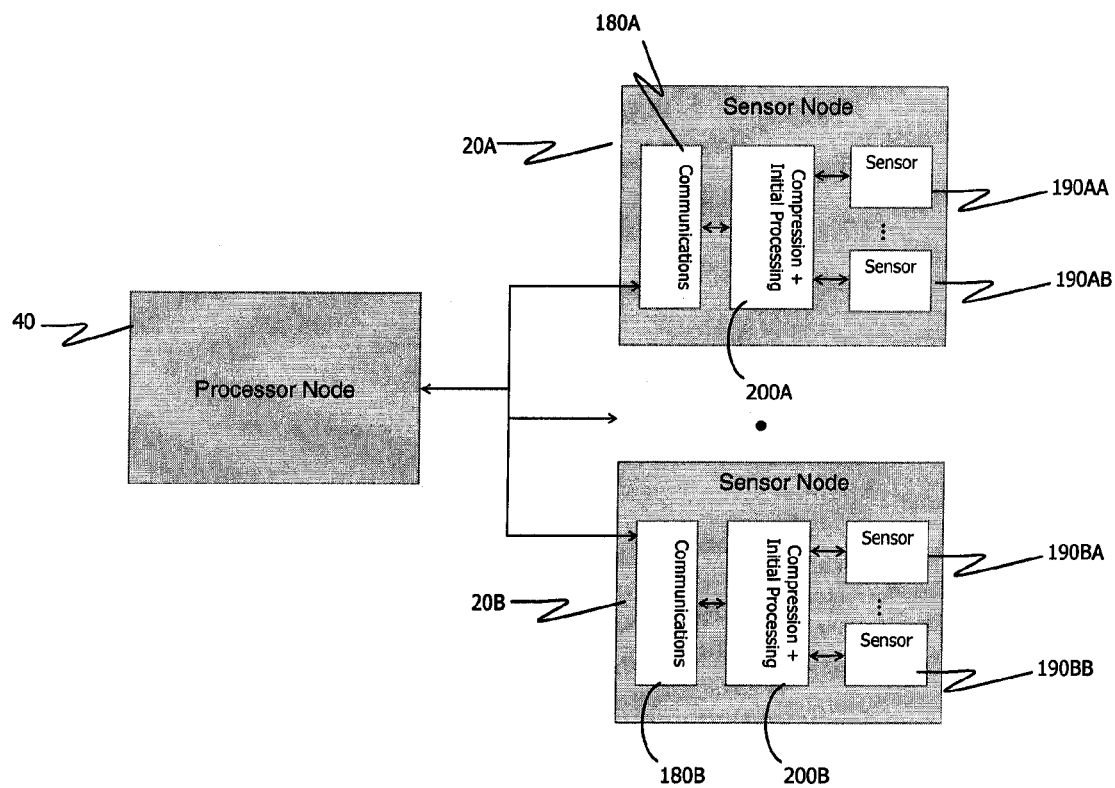
FIG. 3 is a block diagram including a sensor node according to the invention.

Having generally described the invention, refer now to FIGS. 1 through 3 that depict certain aspects of our invention. FIG. 1 depicts the overall architecture of our system. A processor node 40 is connected via a wired or wireless local network 30 to sensor nodes 20A, 20B, 20C which monitor an animal environment 10. The processor 40 is connected as well via a local network or digital communications channel to a control monitor 60, which is used to control system parameters and to view activity and sensor observation logs. The processor 40 is also optionally connected to the Internet 50, and the system may be controlled remotely via a web server interface. The processor is optionally connected via analog or digital signaling means to one or more audio or visual alarms 70, which may be a bell or light, using the protocols and signaling means of a home security system or home electronic control system. The processor is also optionally connected directly to a pager or cell phone terminal interface 80, to send a SMS or cell phone voicemail. Audio/Visual alarms 70 and the pager/phone interface 80 are used to send alert notifications to an operator; alert notifications may also be sent via standard Internet protocols using the Internet 50.

FIG. 2 shows the architecture of the processing node 40 in more detail. Sensor observations are communicated from sensor nodes 20A, 20B, 20C to decompression/registration unit 90, which performs necessary decoding and spatio-temporal alignment and/or projection of observations into a global coordinate frame. The audio/visual feature analysis and tracking module 100 performs basic audio difference analysis, video foreground/background extraction, contour extraction, and shape/appearance characterization and tracking. Summaries of registered observations, as well as tracked features, are recorded in a database 130. Event detection 110 is performed by comparing the database of previous observations and a priori models to current observations to detect events of defined interest, or detect events that appear to be rare or unusual given previous experience. A filter module 140 selects events that are of sufficient interest to generate an alarm notification, and are sent to alarm generator 170 which selects an alarm format and communication modality according to the current context. Context and alert parameters may be specified by an operator using an interface 160. Upon receiving an alert or alarm notification, an operator can review details of the event and underlying observations which generated the alert or alarm using an activity review interface 150.

FIG. 3 shows certain details of a sensor node 20A (and a second sensor node 20B), including a communications module 180A (and 180B on the second sensor node), module 200A (and 200B on the second sensor node) for initial processing and compression (for digital signals) or encoding (for analog signals), and individual sensors 190AA, 190AB (and 190BA, 190BB on the second sensor node 20B).

A further embodiment of our invention includes means for control of active sensors within the monitoring and alerting system. When sensors have an active control element, such as a pan-tilt-zoom capability, they can be directed to scan the scene in a fixed pattern to search for a particular animal or event. The operator may specify that the active cameras shall track a particular animal or animal type when detected in the environment. Active cameras may also be directed to focus on locations where particular animals or events have been detected from other sensor nodes. In a yet further embodiment, one set of wide angle or wide coverage sensors provides coarse detection of animals and activities, and another set of sensors for focused or narrow angle views provides detailed observation of animals and activities.

While portions of the above description have focused on examples where alerts are sent to a single human owner or operator, our system is not limited in this regard and notifications may be sent to multiple owners or operators, or specified groups, and/or may be used to signal further automatic (non-human) intelligent processing to inspect and remedy the particular situation.

It should now be appreciated that a system for monitoring and alerting based on animal behavior includes a sensor to observe one or more animals using a sensor network, a processor (computer) to capture tracking information and to interpret animal state based on sensor observations, and a communication device to communicate alerts based on animal state.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A system for monitoring and alerting based on detected animal activity comprising:
   two or more sensor nodes, each sensor node comprising at least an audio sensor and a video sensor within a corresponding environment of an enclosed space, each sensor node also incorporating a compression and initial processing unit and a communications unit configured to transmit sensor observations to a processor node, wherein each of the sensors within the two or more nodes is automatically calibrated without requiring a user-aided calibration process;
   the processor node is configured to integrate the sensor observations from multiple modalities to detect activity of an animal living in the environment, the processor node comprising:
   a decompression/registration module configured to decompress the sensor observations provided by the two or more sensor nodes and to perform spatio-temporal alignment of the sensor observations into a global coordinate frame;
   an audio/visual feature analysis and tracking module configured to receive data from the decompression/registration module and to perform audio difference analysis, video foreground/background extraction, contour extraction, and shape/appearance characterization and tracking on the data received from the decompression/registration module;
   a database configured to store summaries of registered observations from the decompression/registration module and to store tracked features received from the audio/visual feature analysis and tracking module;
   an event detection module configured to compare previous observations stored in the database and at least one a priori model with current sensor observations received from the audio/visual feature analysis and tracking module to detect events of a defined interest;
   a filter module configured to select events that are of sufficient interest from the detected events to generate an alert, wherein the selected events are based upon at least one filter property; and
   a communication device configured to automatically communicate the alert to a user on one of a plurality of communication modalities selected in accordance with at least one context parameter of the user and at least one context parameter of the animal, wherein the user operates an alert/context specification interface to select the at least one filter property, the at least one context parameter of the user and the at least one context parameter of the animal.

2. The system of claim 1, wherein the plurality of communication modalities comprise a pre-recorded voicemail or a SMS text message sent to a cell phone, a page sent to a pager and an email.

3. The system of claim 1, wherein the at least one filter property is a sensitivity level.

4. The system of claim 1, wherein at least one sensor node of the two or more sensor nodes includes at least one video sensor with wide angle field of view and at least one video sensor with a narrow angle field of view.

5. The system of claim 1, wherein the processor node is coupled to the two or more sensor nodes via a wired or wireless network.

6. The system of claim 1, wherein the at least one context parameter of the user comprises a time of day, a location of the user, and a current task or job being performed by the user.

7. The system of claim 1, wherein the user can remotely view or listen to the sensor observations that generated the alert.

8. The system of claim 1, wherein at least one of the a priori models is constructed to represent animal activity observed over time.

9. The system of claim 1, wherein the processor node is further configured to be controlled remotely via a web server interface.

10. The system of claim 1, wherein the processor node further comprises an activity review interface configured to allow the user to view the current sensor observations, observations corresponding to the event that generated the alert, or a summary of recent animal activity on a control monitor or an Internet connected terminal.

11. The system of claim 1, wherein the at least one context parameter of the animal comprises a medical condition of the animal.

12. The system of claim 1, wherein the corresponding environment of an enclosed space comprises one of a stall, a cage, a paddock, a pasture, a tie-stall, a zoo exhibit space and a designated area in and around a residential home or farm.

* * * * *